Sept. 3, 1968   H. FRIELINGSDORF ETAL   3,399,508
APPARATUS FOR FORMING BOTTLES OR SIMILAR CONTAINERS FROM
THERMOPLASTIC MATERIAL, FILLING THEM WITH LIQUID AND
SUBSEQUENTLY SEALING THEM IN ONE OPERATION
Filed July 8, 1965   3 Sheets-Sheet 1
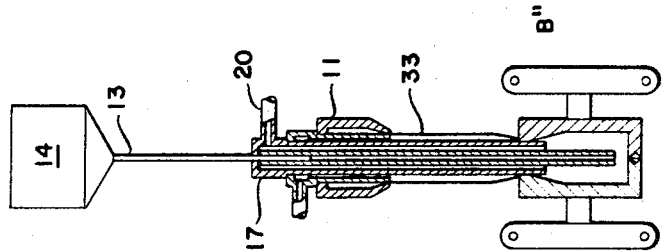
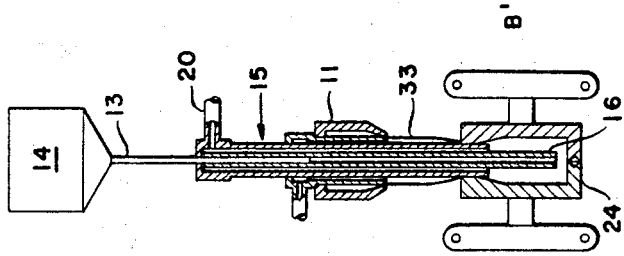
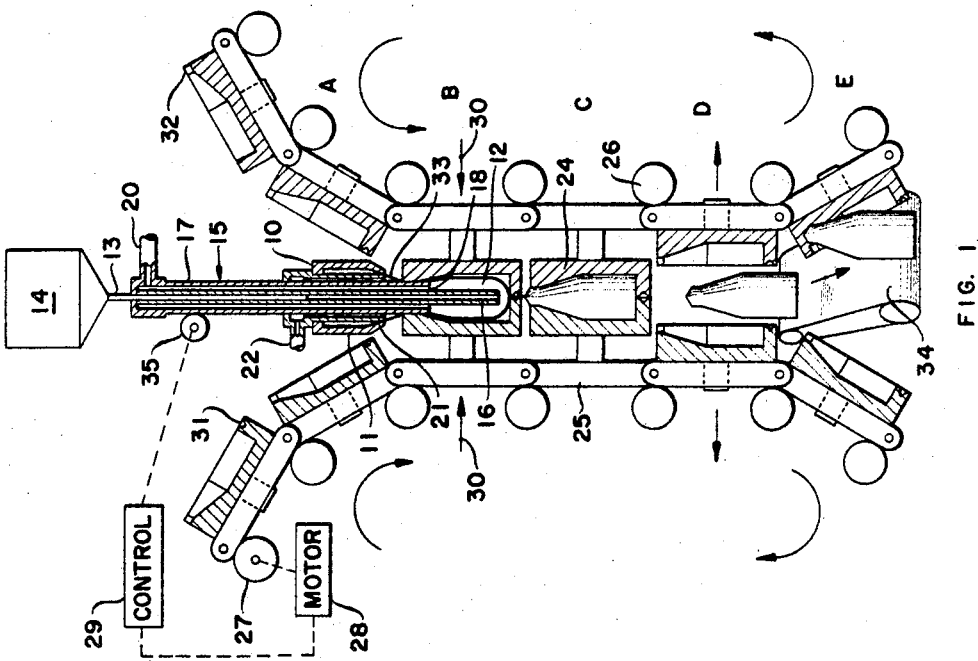
INVENTORS:
HANS FRIELINGSDORF
MAURITS BOONSTOPPEL
BY:
THEIR ATTORNEY Sept. 3, 1968  H. FRIELINGSDORF ET AL  3,399,508
APPARATUS FOR FORMING BOTTLES OR SIMILAR CONTAINERS FROM
THERMOPLASTIC MATERIAL, FILLING THEM WITH LIQUID AND
SUBSEQUENTLY SEALING THEM IN ONE OPERATION
Filed July 8, 1965  3 Sheets-Sheet 2
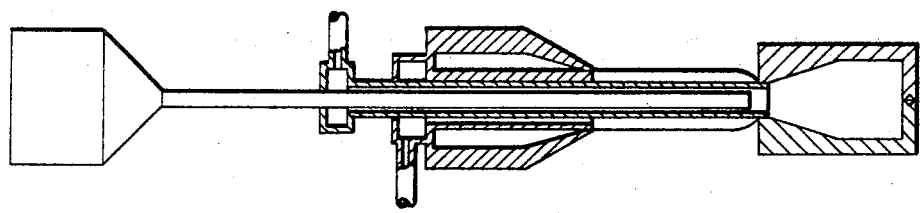
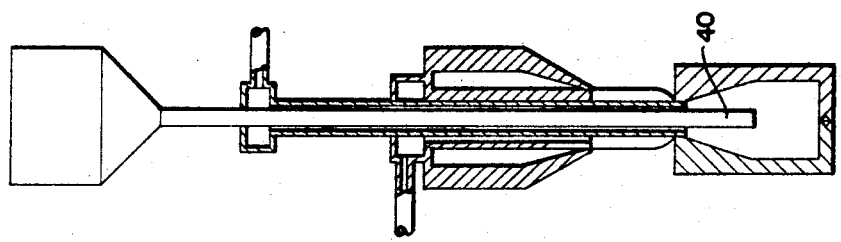
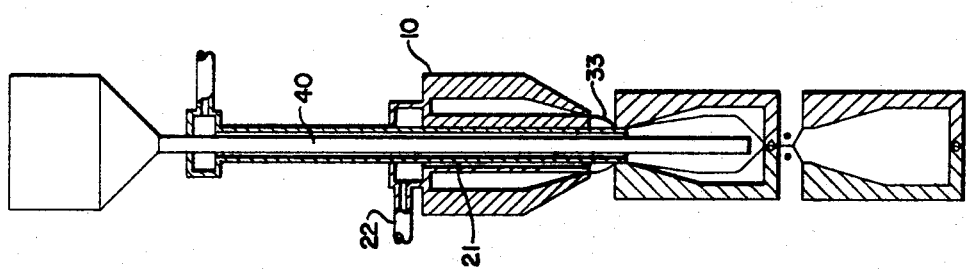
INVENTORS:
HANS FRIELINGSDORF
MAURITS BOONSTOPPEL
BY:
THEIR ATTORNEY INVENTORS:
HANS FRIELINGSDORF
MAURITS BOONSTOPPEL
BY: *[signature]*
THEIR ATTORNEY United States Patent Office 3,399,508
Patented Sept. 3, 1968

3,399,508
APPARATUS FOR FORMING BOTTLES OR SIMILAR CONTAINERS FROM THERMOPLASTIC MATERIAL, FILLING THEM WITH LIQUID AND SUBSEQUENTLY SEALING THEM IN ONE OPERATION
Hans Frielingsdorf and Maurits Boonstoppel, Delft, Netherlands, assignors to Shell Oil Company, New York, N.Y., a corporation of Delaware
Filed July 8, 1965, Ser. No. 470,357
Claims priority, application Netherlands, July 10, 1964, 6407852
1 Claim. (Cl. 53—140)

ABSTRACT OF THE DISCLOSURE

An extrusion apparatus for continuously extruding and filling plastic containers. The apparatus utilizes a pair of endless chains that carry a plurality of mold sets positioned so that the mold sets close about a plastic tube that extends from a die head. The die head includes concentric tubes that supply compressed air for forming the container and material for filling the container.

---

The invention relates to the forming and filling of bottles or other containers made from plastic material, particularly thermoplastic material, in which the bottles or other containers are formed, filled and sealed in the same mold and in one operation.

The invention has many advantages as compared with the method in which the bottles are formed by means of a first machine, then transported to a second and, possibly, a third machine to be filled and sealed. In addition to the advantages of fewer machines, less transport and smaller space being required, it is possible to avoid contaminating the containers with bacteria or otherwise, before or during filling. Thus, it is easy to satisfy sterility requirements for milk containers and other food products.

In the prior art method, hot plastic material is extruded downward from an extrusion die head in the form of a tube (known as a parison). When this tube has reached the length required for a container it is enclosed by a multiple section mold, the lower end of this mold sealing the tube, and the upper end thereof fitting against the tube to form the neck. A line passing through the extrusion die head supplies compressed gas or air to the interior of the tube section inside the stationary mold. The compressed air expands the tube section to form the body of the container in conformity with the interior shape of the mold. After the container is formed the mold opens to allow the container to be removed downward. The neck of the container remains united with a new tube section extruded from the extrusion die head until the latter tube section has reached the length required for the next container, whereupon the cycle is repeated. The container is then removed, filled and sealed in a separate operation.

Thus, in this known method one extrusion die head cooperated with only one mold, which limits the capacity of the machine owing to the intermittence of the extrusion. Also the containers must be removed for separate filling and sealing.

Thus, in this known method one extrusion die head cooperates with only one mold, which limits the capacity of the machine owing to the intermittence of the extrusion. Also the containers must be removed for separate filling and sealing.

By contrast, according to the present invention, the extrusion takes place continuously (although not necessarily at a constant speed) and a plurality of molds move along with the extruded tube in such a way that whenever a container is being formed and/or filled in one mold, the tube section for the next mold is being extruded. Furthermore, when the upper end of the mold fits against the plastic tube to form the neck, this upper end forces the tube on to a supporting element in a substantially airtight manner. The supporting element is situated outside the line through which gas or air under pressure is supplied and is movably mounted in the extrusion die head and moves along with the neck while the compressed air is being supplied. The supporting element is withdrawn to its original position after the termination of the supply of compressed air and prior to the filling and sealing of the neck of the bottle. This method has the effect of eliminating superatmospheric pressure inside the tube being extruded for the next container so that this tube section is not prematurely blown up.

It is preferred to arrange for the supporting element to come into contact with the plastic tube only where the neck is to be formed, and consequently to give this element a diameter smaller than that of the extruded tube; moreover, the supporting element is preferably formed from a material which shows no tendency to adhere to the plastic material.

The method of the invention thus provides a system where there are always two or more containers at various stages of forming at the same time. This results in the number of containers produced per unit of time being increased. The capacity is also influenced by the cooling effected by the liquid on a newly formed container, as a result of which the time during which a container has to remain within a mold is appreciably shorter than it would be if the empty container were to be cooled only from outside. Moreover, the manufacture of thin-walled throw-away containers and the subsequent filling inside the mold constitute a great advantage as compared with the separate forming, transporting and filling of easily deformable bottles.

The invention will be more easily understood from the following description when taken with reference to the attached drawings in which:

FIGURE 1 is is an elevation view partly in section of a machine constructed according to this invention;

FIGURES 2 and 3 illustrate diagrammatically two stages of operation of the machine shown in FIGURE 1;

FIGURES 4, 5 and 6 illustrate diagrammatically various stages of operation of the machine shown in FIGURE 1 using a modified extrusion die head.

Figure 9:
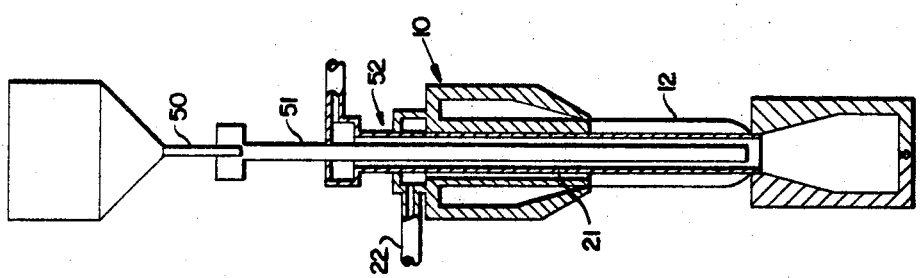
FIGURES 7, 8 and 9 illustrate diagrammatically various stages of operation of the machine shown in FIGURE 1 using a second modified extrusion die head.

Referring to FIGURE 1, the extrusion die head 10 is provided with an annular extrusion orifice 11. In a known manner, for example, by means of a worm screw, hot plastic material in the plastic state is extruded out this orifice in the form of a tube 12, the so-called parison. Through the center of the extrusion die head passes a supply pipe 13, through which liquid may be fed from a dispensing device or vessel 14 and which maintains a fixed position relative to the extrusion die head 10. Disposed concentrically about the supply pipe 13 is a double-walled air pipe 15 which is movable in a longitudinal direction relative to the extrusion die head 10. The inner wall 16 of this pipe encloses the supply pipe 13 and thus forms a continuation of the latter in order to fill the finished container with liquid. The outer wall 17 of the double-walled air pipe 15 extends only to the point 18 and encloses only the upper portion of the inner tube 16. The open-bottomed annular space formed between the inner wall 16 and the outer wall 17 serves to supply and remove gas under pressure, such as compressed air from the tube 12. For this purpose the annular space is connected to a compressed air line 20 near the closed upper end of the circular space.

In the extrusion die head there is also provided a channel 21 which at one end issues inside the annular extrusion orifice but outside the outer wall 17 of pipe 15. The channel 21 is connected at 22 to a gas supply, for example, a sterile gas, at atmospheric or slightly above atmospheric pressure. Thus the channel 21 may be used to introduce a sterilizing gas into the tube 12.

Underneath the extrusion die head 10 there are a number of molds 24, each consisting of two halves so that they are adapted to be opened and closed. In the positions A, D and E such a mold is opened, in the positions B and C of FIGURE 1, as well as in the position B' and B" of FIGURES 2 and 3, it is closed. In the closed position the mold is arranged concentrically around the extension of the center line of the extrusion die head. The molds 24 or their corresponding halves are mounted on the links 25 of an endless chain actuated by a driving mechanism. The links 25 may be supported by a series of rollers 26 that are spaced to provide sufficient support for the links. In addition it may be desirable in some systems to resiliently mount the rollers to provide for slight misalignment of the molds.

The links may be driven in any desired manner for example by means of a motor 27 driving a sprocket 28 that engages the links 25. The motor may include a speed control to permit adjustment of the speed of molds to correspond to the speed of the extrusion as explained below. In this manner the mold halves can be moved downward at a mutually equal speed and at the end of their downward movement can be moved upward again via a different route so as to recommence their downward course.

The motor 28 is also used to drive the air supply pipe 15 downward in synchronism with the movement of the molds 24. The drive of the air pipe may be accomplished through a control 29 and drive wheel 35 that engages the air pipe 15. The control 29 may be a mechanical control that drives the air pipe 15 downward until the container is filled and then retracks the air pipe. The air pipe may be retracted by reversing the direction of rotation and speed of the drive wheel 35.

The method of operation is as follows:

Referring to FIGURES 2 and 3, a length of tube 33 nearly sufficient for forming a bottle is extruded. The air pipe 15 is close to its lowermost position and is about to move upward to the position B in FIGURE 1, in which position the lower end 16 of the air pipe only extends beyond the extrusion die head a relatively short distance. At this stage there is no pressure inside the air tube 15. The two mold halves 24 now move toward the parison 12 (see the arrows 30 in FIGURE 1), the lower edges 31 of the mold halves 24 closing the tube and the upper rims 32 enclosing the tube 33 to form the neck of the bottle. When the upper rims 32 close on the tube they force the parison 12 in an airtight manner on to the outer wall 17 of the lower end of the air pipe 15. Thus, only the parison 12 enclosed within a mold 24 is in communication with the air line 15. In this way the lower end of the air pipe wall 17 form a neck-supporting and sealing element. The mold 24 as well as the air pipe 15 is moved downward along with the parison 12 at a speed which is substantially equal to the rate of extrusion, air under pressure being simultaneously admitted via the pipe 15 to cause the parison 12 enclosed in the mold to be blown up to form a container. Once the parison has assumed its desired shape, the pressure in the air pipe 15 is released. A controlled amount of liquid is now admitted to the finished container via the filling pipe 13 and 16 (B' in FIGURE 2). Preferably, the filling pipe 16 extends downward beyond the outer wall 17 of the air pipe 15 to such an extent that at the very outset of the filling operation the lower end of the pipe issues at a point as close as possible to the bottom of the finished bottle. In this way splashing and foaming of the liquid is prevented as much as possible.

Cooling of the parison is effected not only by its being in contact with the mold 24 but also, and to a greater extent, by the liquid introduced into the bottle. Once the neck is sufficiently cooled down, and, therefore, solidified, the air pipe 15, which during filling merely served to support the neck and for the release of air, may be retracked to its original position. The filled bottle is subsequently sealed by nipping the neck (at C in FIGURE 1), which may be effected by means of a sealing mechanism, which may either be mounted on the mold in which the bottle is formed, or form as an integral part of the next mold, or be separate from both. The mechanism for nipping and sealing the neck is not shown in FIGURE 1, such devices being well known. Together with this sealing operation or subsequent thereto the connection with the next bottle and consequently, with the parison, may be severed (at D in FIGURE 1), whereupon the bottle, after opening of the mold, may be removed, for example, by means of a conveyor belt 34 at E in FIGURE 1.

It is of importance that no adhesion or appreciable friction should occur between the supporting element on the lower end of the air pipe and the parison. Hence, the diameter of the supporting element will most preferably be smaller than the inside diameter of the parison, the surface being made of a material over which the formed neck of the bottle easily slides. A suitable material for use in extruding polyethylene or polypropylene would be a polymer of tetrafluoroethylene known as "Teflon."

In the embodiment shown in FIGURE 1, a special arrangement is used for preventing the outer wall 17 of the air pipe 15 from coming into contact with the parison. This arrangement consists of an air connection 22 and a channel 21, through which, during the extrusion, air is introduced into the expanding space between the wall of the air pipe and the parison. It is not a disadvantage for the air to have a slight pressure to ensure that the parison is kept at sufficient distance from the air pipe, provided the extent of blowing up does not hamper the enclosure of the parison by a mold. It is to be understood that instead of arranging for the supporting element to form part of the air pipe, as shown in embodiment of FIGURE 1, it may also form part of a separate movable supporting tube, with which a stationary air pipe is disposed.

An alternative embodiment is shown in FIGURES 4, 5 and 6 and differs from the embodiment of FIGURE 1 in that the filling line does not consist of a stationary tube 13 and a movable tube 16, but uses a long stationary filling line 40. The filling line 40 retains in a fixed position relative to the extrusion die head. The rate at which the liquid is introduced into the container may be so selected that the lower end of the filling line remains slightly below the liquid level in the descending container which is being filled as shown in FIGURES 5 and 6.

Figure 8:
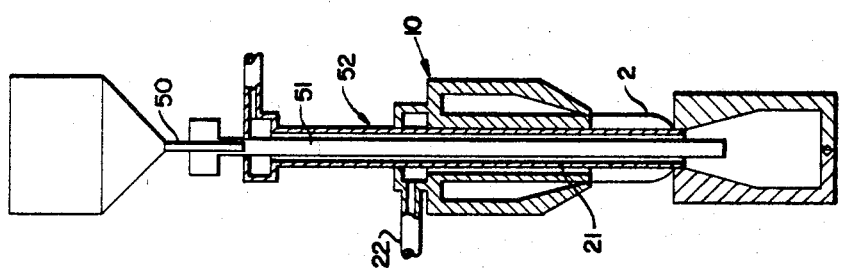
Figure 7:
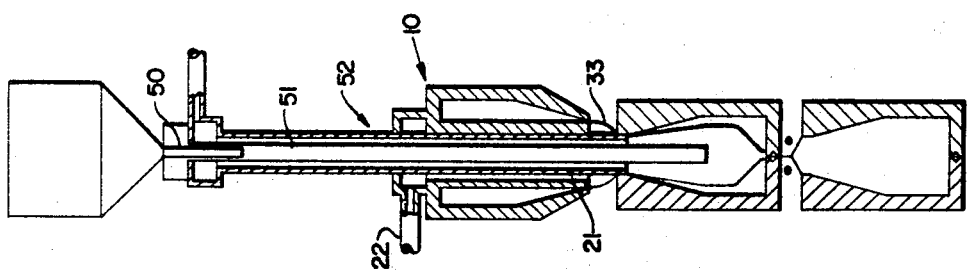

In addition, the filling line may also be composed of a stationary part and a movable part, with the movable part being kept detached from the air pipe so that the movable part may be given the motion considered the most desirable. A construction of this type is shown in the FIGURES 7, 8 and 9. The liquid line 50 extends into the vertically movable filling line 51, which is enclosed by the single-walled air pipe 52.

It is also possible for the filling line to form an integral part of the dispensing device (as shown in FIGURES 4, 5 and 6) and for the whole assembly to be vertically movable. In all these cases the construction is preferably designed in such a way that during filling the outlet of the filling line more or less coincide with the liquid surface or is below the liquid surface.

It is to be understood that the movements of the various components (molds, supporting element, filling pipe, sealing mechanism and the like) must be coordinated relative to each other and in relation to the extrusion rate by means of a suitable control mechanism.

If desired, the speed at which the molds (and the supporting element) move downward may be greater than the linear speed at which the parison leaves the extrusion orifice so that as a result the parison is stretched, the wall thickness is reduced and at the same time swinging of the parison is largely prevented.

If the liquid is supplied in a sterile condition and if the gas supplied through 15 and, possibly, 22 is also sterilized, the contents of the formed and filled bottle will be completely sterile, since owing to its high temperature (for example, 150 to 250° C.) the extruded tube itself is also sterile. This sterility is of major importance for beverage, such as, for example, milk, and for serums.

The liquids for filling the bottle may be free-flowing or viscous, and may even have the consistency of a paste.

If the liquid is not allowed to come into contact with air, or if for other reasons a special gaseous atmosphere is desirable for the liquid, this does not present a difficulty since instead of air, for example, nitrogen, oxygen or another gas may be supplied through the line 15, and possibly, line 22.

For the purpose of actuating the mold halves, i.e., for opening and closing them as well as for moving them in the direction of the tube movement, use may be made of various known mechanisms. As shown, the mold halves are, for example, coupled together on either side by links 25 and thus form a kind of chain which travels over power-driven chain wheels. To ensure proper closing of the mold halves resilient guides may be arranged.

A suitable plastic material for the manufacture of milk bottles is polyethylene, Experiments have shown that the milk did not change its flavor by being in contact with the hot, almost finished, bottle. Experiments in which the milk was kept at room temperature or in a cooled room for a few days also showed that the milk had at least the same keeping quality as when contained in the conventional glass bottles. Also the passing of the milk through the hot extrusion die head was found to have no adverse effect on the quality of the milk.

We claim as our invention:

1. An apparatus for extruding a container, filling the container and sealing the container in a continuous operation, said apparatus comprising:

an extrusion die head for extruding a tube of plastic material;

a gas supply line passing through the extrusion die head to supply gas under pressure;

a supporting element, said supporting element being movably arranged in the extrusion die head to move in the direction in which the tube of plastic is extruded, said supporting element in addition supporting said tube of plastic material and enclosing said gas supply line;

a second gas supply line, said second gas supply line being disposed in said supporting element, said second gas supply line terminating in an open end adjacent said extrusion die head;

a plurality of mold sets, each mold set being formed of a plurality of parts that can close about said tube of plastic material;

two endless chains, said chains being disposed to pass in substantially parallel paths along the axis of movement of said supporting element, said endless chains being formed from a plurality of equal length links with the links being substantially aligned as they traverse said parallel path, part of each mold set being mounted on each of the substantially aligned links;

drive means, said drive means being coupled to both said endless chains and supporting element to move said endless chains and supporting element in synchronization;

control means, said control means being coupled to said drive means to control the speed of said drive means to synchronize the movement of said endless chains and said support member with the extrusion rate of said die head; and a material filling line, said material filling line extending partially through said gas supply line whereby the container may be filled after it is formed.

References Cited

UNITED STATES PATENTS 3,035,302    5/1962    Lysobey.
3,089,186    5/1963    Park _____ 264—98 XR

FOREIGN PATENTS 954,473    4/1964    Great Britain.

WILLIAM W. DYER, JR., *Primary Examiner.*

R. L. FARRIS, *Assistant Examiner.*